United States Patent [19]
Jones

[11] 4,162,991
[45] Jul. 31, 1979

[54] RECOVERING COBALT AND BROMIDE CATALYST VALUES USING A STRONG ANION EXCHANGE RESIN

[75] Inventor: Peter J. V. Jones, Middlesbrough, England

[73] Assignee: Imperial Chemical Industries Limited, London, England

[21] Appl. No.: 883,309

[22] Filed: Mar. 3, 1978

[30] Foreign Application Priority Data
Apr. 25, 1977 [GB] United Kingdom ............... 17130/77

[51] Int. Cl.² ............... B01J 23/94; B01J 27/32; C01G 51/00; C07C 51/33
[52] U.S. Cl. ............... 252/413; 252/411 R; 423/139; 562/414
[58] Field of Search ............... 252/411, 413, 415; 260/525; 423/139; 210/37 B, 38 B; 562/414

[56] References Cited
U.S. PATENT DOCUMENTS

| | | | |
|---|---|---|---|
| 3,235,377 | 2/1966 | Hard et al. | 423/139 |
| 3,650,688 | 3/1972 | Fekete et al. | 423/139 |
| 3,880,920 | 4/1975 | Wampfler | 252/413 |

FOREIGN PATENT DOCUMENTS

899288 6/1962 United Kingdom ............... 260/525

*Primary Examiner*—P. E. Konopka
*Attorney, Agent, or Firm*—Cushman, Darby & Cushman

[57] ABSTRACT

Cobalt catalyst values are recovered from mother liquors remaining from oxidations to mono- or polycarboxylic acids in lower aliphatic monocarboxylic acids in presence of catalysts comprising cobalt and bromide ions by (1) if necessary, adjusting the cobalt and bromide concentrations so that they are within specified limits (2) adsorbing cobalt and bromide ions (differentially with respect to extraneous ions) on a strongly basic anion exchange resin and (3) desorbing cobalt and bromide ions with lower aliphatic monocarboxylic acid containing more than 10% by weight of water.

10 Claims, 1 Drawing Figure

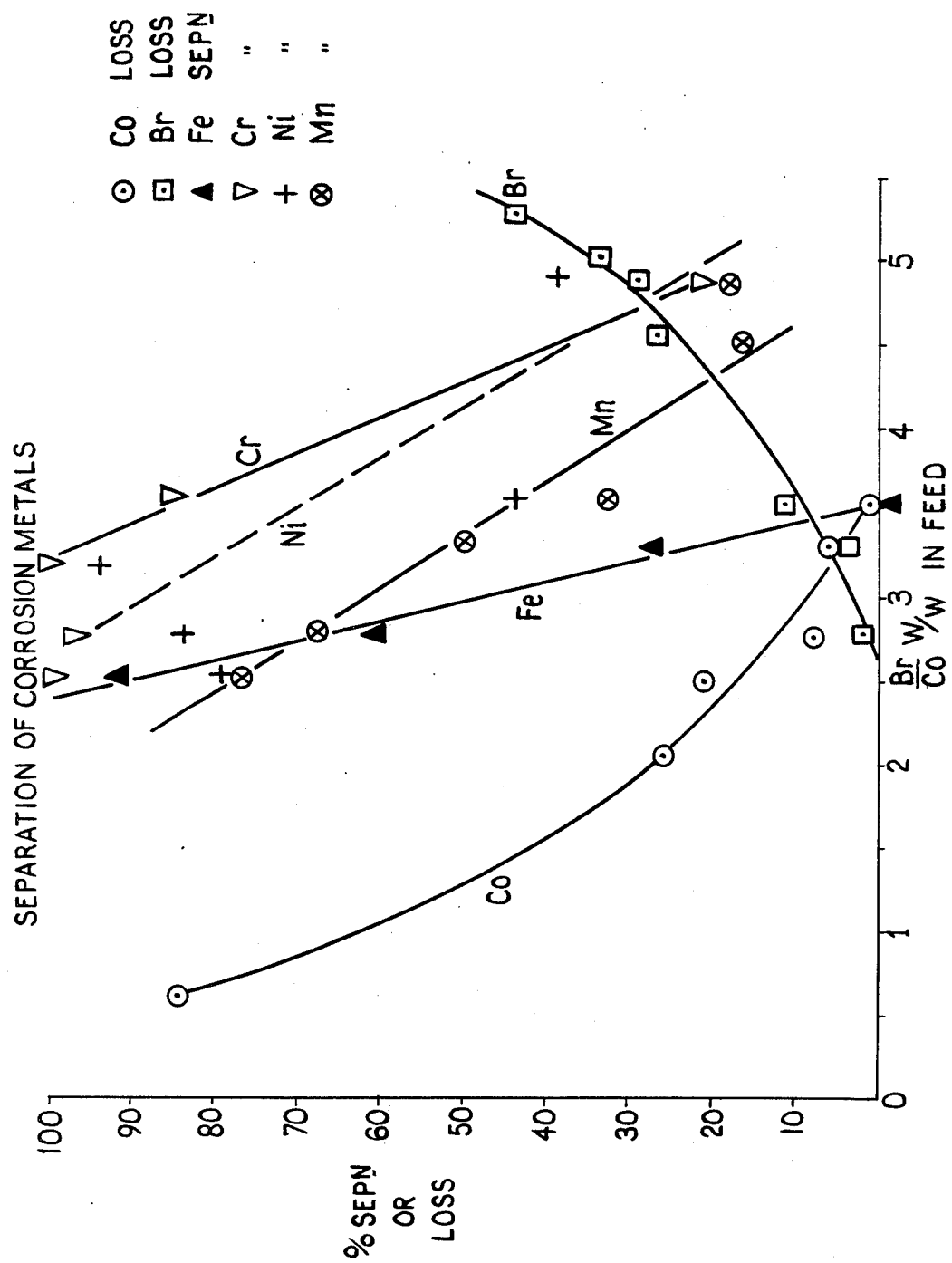

RECOVERING COBALT AND BROMIDE CATALYST VALUES USING A STRONG ANION EXCHANGE RESIN

This invention relates to a process for recovering cobalt catalyst values, more especially from reaction mixtures resulting from the manufacture of mono or polycarboxylic acids by catalytic liquid phase oxidation with a molecular oxygen-containing gas of feedstocks oxidisable thereto, using a catalyst comprising cobalt.

The invention provides a process for recovering cobalt catalyst values from the reaction mother liquor resulting from the oxidation in the liquid phase to a mono or polycarboxylic acid for a feedstock oxidisable thereto by means of a molecular oxygen-containing gas in presence of a lower aliphatic monocarboxylic acid and of a catalyst comprising cobalt and bromide ions followed by separation of the said mono or polycarboxylic acid from the said reaction mother liquor, which process comprises, (1) if necessary, adjusting the cobalt concentration in the said reaction mother liquor so that it is from 0.1% to 10% by weight of cobalt in said lower aliphatic monocarboxylic acid, and, if necessary, adjusting the bromide concentration so that the ratio of bromide to cobalt is from 1.5:1 to 4.5:1 by weight, (2) contacting the resulting solution containing cobalt and bromide ions with a strongly basic anion exchange resin whereby cobalt and bromide values are absorbed on said resin, and (3) eluting cobalt and bromide values from the said anion exchange resin with lower aliphatic monocarboxylic acid containing more than 10% by weight of water.

Other heavy metal ions which may be used in catalysts in addition to cobalt ions, for the manufacture of mono or polycarboxylic acids by oxidation of an appropriate feedstock with a molecular oxygen-containing gas are for example, manganese, cerium and zirconium.

Mono or polycarboxylic acids manufactured by catalytic oxidation reactions from which the cobalt and bromide catalyst values may be recovered by the process of our invention include those resulting from the oxidation of hydrocarbon feedstocks. Particularly suitably hydrocarbon feedstocks are monoalkylbenzenes, for example toluene and ethylbenzene oxidation of which leads to benzoic acid, dialkylbenzenes, for example xylenes, diethylbenzenes and diisopropylbenzenes oxidation of which leads to phthalic acids, namely o-phthalic acid, isophthalic acid and terephthalic acid according to the orientation of the alkyl substituents in the starting hydrocarbon, and trialkylbenzenes, for example 1, 2, 4-trimethylbenzene oxidation of which leads to trimellitic acid. Other suitable hydrocarbon feedstocks are, for example cyclohexane giving adipic acid on oxidation. Other suitable feedstocks are di(-halogenoalkyl)-benzenes, for example di(chloromethyl)benzene, oxidation of which gives phthalic acids, and partially oxygenated derivatives of hydrocarbons, whether these are obtained by partial oxidation of the hydrocarbons themselves or by other methods. Such partially oxygenated derivates are usually alcohols, aldehydes or ketones, or carboxylic acids, for example methylbenzyl alcohols, tolualdehydes, toluic acids, carboxybenzaldehydes, cyclohexanol and cyclohexanone. Mixtures of such feedstocks may be used.

The lower aliphatic monocarboxylic acid preferably has from 2 to 4 carbon atoms for example acetic acid, propionic acid and butyric acid. Acetic acid is especially preferred.

The mono or polycarboxylic acid product of the oxidation reaction is separated from the reaction mother liquor usually by filtration or centrifuging. The carboxylic acids are usually solids relatively poorly soluble in the lower aliphatic monocarboxylic acid except at elevated temperatures, and separation of the carboxylic acid may be assisted by cooling the reaction mixture and/or by distilling off lower aliphatic monocarboxylic acid and/or water prior to separation. The mother liquor contains, in addition to the lower aliphatic monocarboxylic acid and cobalt and bromide catalyst values, other ions which may be introduced as catalysts or incidentally to the introduction of such catalyst ions, water which is formed in the oxidation reaction and which may be incompletely removed during the reaction and any preliminary treatment, organic impurities, for example small amounts of carboxylic acid oxidation product, incompletely oxidised material and by products, and metallic impurities especially traces of metals removed from the structure of the manufacturing plant by corrosion, for example iron, chromium or nickel. Ions introduced incidentally may, for example, be alkali metal, especially sodium ions, where, for example bromide ion is introduced as sodium bromide or where for example, caustic alkalis are used in the plant for washing purposes and small amounts are transferred to the mother liquor.

In step 1 of our recovery process the concentration of cobalt ions is, if necessary, adjusted to be in the range 0.1% to 10% by weight since the recovery process is uneconomic at much lower concentrations than 0.1%. Preferably the concentration is in the range 0.2% to 2%. Although in many cases the cobalt concentration in the mother liquor will be within the specified range, and no adjustment of the cobalt concentration is necessary, in some instances, concentration of the mother liquor may be desirable and this is conveniently effected by distillation. Where concentration is effected by distillation an overhead fraction is obtained comprising lower aliphatic monocarboxylic acid and water in so far as water is present in the mother liquid. The proportion of overhead fraction obtained from the mother liquor depends on the degree of concentration it is desired to effect in the heavy metal ions in the mother liquor which depends on the absolute amounts present there initially. The lower aliphatic monocarboxylic acid so recovered which may contain as hydrogen bromide some of the bromide ion present in the mother liquor may be re-used in the oxidation process. Water present in the solution to be fed to the resin should contain less than 10% by weight of water and preferably less than 5% by weight. If necessary, the proportion of water in the mother liquor may be reduced by distillation.

Also in step 1 of our recovery process the bromide content of the solution to be fed to the resin is adjusted, if necessary, so that the ratio of bromide to cobalt is from 1.5:1 to 4.5:1 by weight. This is normally effected by adding more bromide ion, preferably in the form of hydrobromic acid. In the oxidation process giving rise to the mother liquor from which catalyst values are recovered according to our process, the bromide present in the catalyst may be lost in part by volatisation with the oxidation off-gases. Similarly where a concentration step is employed in our process more bromide may be lost by volatilisation with lower aliphatic monocarboxylic acid and water. Such volatilised bromide may, of course, be recovered and used, at least in part, to adjust the bromide to cobalt ratio in step 1 of our process. However, since the cobalt and bromide values eluted from the resin in step 3 of our process are preferably recycled to provide catalyst values for the oxidation, and since there are inevitably some irrecoverable bromide losses from the oxidation, the addition of bromide in step 1 will, in these circumstances, include a proportion of fresh bromide to replace losses.

The actual ratio of bromide to cobalt chosen within the limits of 1.5:1 to 4.5:1 by weight in step 1 will depend on the degree of separation of cobalt and bromide ions from other ions which it is desired to achieve, and will be discussed below.

In step 2 of our recovery process the solution of cobalt and bromide in lower aliphatic monocarboxylic acid is contacted with a strongly basic anion exchange resin. The latter may be any strongly basic anion exchange resin, for example a polytetramethylammonium polystyrene such as Dowex 1-X8 or Amberlite IRA-910 (the words DOWEX and AMBERLITE are Trade Marks.). Contacting may be effected in any convenient manner, a particularly suitable method being to pass the solution through a column containing the ion exchange resin. As a result of the contact cobalt and bromide ions are absorbed on the resin. Since the solution containing cobalt ions also contains bromide ions the anion exchange resin is preferably employed in its bromide form, obtained for example by prior treatment of the resin with hydrobromic acid. Alternatively the resin may be in the form of its salt with the lower aliphatic monocarboxylic acid, for example in the acetate form.

After cobalt and bromide ions have been adsorbed on the anion exchange resin it is preferably given a displacement wash with lower aliphatic monocarboxylic acid to displace solution containing unadsorbed cobalt and bromide. The lower aliphatic mono-carboxylic acid used for the displacement wash should contain not more than 10% by weight of water and preferably not more than 5%.

In step 3 of our recovery process cobalt and bromide ions adsorbed on the anion exchange resin are eluted with lower aliphatic monocarboxylic acid containing more than 10% by weight or water. Preferably the lower aliphatic monocarboxylic acid contains more than 25% by weight of water for example 50%. The resin may then be given a rinse with glacial acetic acid.

Although strongly basic anion exchange resins repel cations such as $Co^{2+}$, cobalt and bromide ions in solution are able to form neutral or negatively-charged complexes which are absorbed by the resin. We have found that when the bromide to cobalt ratio in the feed solution to the resin in step 2 is within the range 2.7:1 to 3.3:1 losses of either cobalt or bromide by non-absorption from the feed solution are small. As the ratio is decreased, cobalt losses increase, and as the ratio increases bromide losses increase.

We have also found that alkali metal ions, such as sodium ions, are not absorbed during step 2 of our process, so that our process is very suitable for separating cobalt and bromide catalyst values from extraneous alkali metal ions (which may be deleterious to the oxidation process) prior to recycle.

We have found further that organic impurities from the oxidation in the mother liquor are substantially not absorbed on the resin, so that our process is also very suitable for separating organic impurities from cobalt and bromide catalyst values prior to recycle.

As regards metal ions present due to corrosion, especially iron, chromium and nickel ions, we have found that these can be removed selectively because the complexes they form with bromide are stable at concentrations of the supporting bromide ligand which are different from the case of cobalt. In general separation of these corrosion metals from cobalt (i.e. they are not absorbed by the resin but cobalt is) improves as the bromide to cobalt ratio decreases; but as such decrease leads to increasing losses of cobalt some compromise is necessary. At a bromide to cobalt ratio of 3:1 cobalt losses are small, but separation of iron is then only 50%, through chromium and nickel show a high degree of separation. However, this degree of separation of iron is adequate to prevent excessive build-up of iron in the mother liquor on recycle.

As a result of the process of our invention the eluted solution contains, relative to cobalt, very much lower proportions of undesirable contaminants, in particular iron, chromium, nickel and sodium, than are present in the reaction mother liquor. The eluate is therefore suitable for recycle of cobalt to the oxidation reaction, after, if necessary, adjusting the relative proportions of other catalyst components to that desired. Bromide is also recovered for recycle with the cobalt.

Not all the mother liquor resulting from the manufacture of the mono or poly-carboxylic acid need to be treated according to the process of our invention. Where the cobalt catalyst values are recycled to the oxidation process it will generally be sufficient to treat only a proportion, for example from 10% to 50% by weight, of the mother liquor in order to maintain oxidation-inhibiting impurities in the oxidation reaction mixture at an acceptably low level. The remainder of the mother liquor may be recycled untreated.

The process of our invention is of particular value for recovering for recycle to the oxidation process cobalt catalyst values from the oxidation of p-xylene to terephthalic acid in the presence of a cobalt, manganese and bromide catalyst and an acetic acid solvent.

The invention is illustrated but not limited by the following Examples.

EXAMPLES 1-3

The major portion of the mother liquor separated from product terephthalic acid resulting from the air oxidation of p-xylene in the liquid phase in acetic acid in presence of a catalyst comprising cobalt, manganese and bromide ions was recycled to the oxidation. The remainder was distilled to remove part of the water and part of the acetic acid and to concentrate the catalyst values. The concentrate had the composition given in the following Table. An excess of the concentrate was poured through a column containing 200 ml of the resin specified in the Table until it was saturated with cobalt. Solvent containing unadsorbed cobalt was flushed clear of the resin with glacial acetic acid. Finally the cobalt was desorbed by pumping through the column at the rate specified in the Table a 50% by weight aqueous solution of acetic acid in water until cobalt could no longer be detected in the eluant by visual inspection. The volume of the eluant and its composition are recorded in the Table, and the proportions of iron, chromium, nickel and sodium, relative to cobalt, before adsorption and after desorption, are calculated.

TABLE 1

| Anion exchange resin | | Example 1 Dowex 1-X8 Acetate | | Example 2 Amberlite TRA-910 Bromide | | Example 3 Amberlite IRA-910 Bromide | |
|---|---|---|---|---|---|---|---|
| Form of resin | | 250 | | 400 | | 250 | |
| Rate eluate applied ml/hr. | Before | 375 | After | 680 | | 620 | |
| Volume of eluant ml. | Adsorp- | | Desor- | | | | |
| Composition of Solutions | tion | | ption | Before | After | Before | After |
| Na. ppm by wt. | 2525 | | 44 | 2525 | 25 | 433 | 11 |
| Cr. ppm by wt. | 29 | | 1 | 29 | 1 | 5 | 1 |
| Mn. ppm by wt. | 1265 | | 152 | 1265 | 82 | 217 | 97 |
| Fe ppm by wt. | 200 | | 6 | 200 | <1 | 34 | 3 |
| Co ppm by wt. | 11665 | | 2765 | 11665 | 5930 | 2000 | 3310 |
| Ni ppm by wt. | 42 | | 2.5 | 42 | <1 | 7.2 | 1 |
| Br ppm by wt. | 9400 | | 66 | 9400 | 11800 | 1610 | 8800 |
| Na. as % of Co | 21.6 | | 1.6 | 21.6 | 0.4 | 21.6 | 0.3 |
| Cr as % of Co | 0.2 | | 0.04 | 0.2 | NIL | 0.3 | 0.03 |
| Fe as % of Co | 1.7 | | 0.2 | 1.7 | 0.02 | 1.7 | 0.09 |
| Ni as % of Co | 0.4 | | 0.1 | 0.4 | NIL | 0.4 | 0.03 |

EXAMPLES 4 to 12

A glass column (44cm × 10 cm$^2$) was charged with a slurry of resin(Amberlite IRA-910; 100 ml) in water. The resulting resin bed was "back washed" with water for ½ hour to give a uniformly packed bed.

The bed was converted to the bromide form by passing a 16% by weight aqueous solution of hydrobromic acid through the bed. When the pH of the feed solution equalled that of the solution leaving the column, the resin was washed with distilled water until no bromide ion was detected in the washing. Glacial acetic acid was then passed through the column to remove water from the resin.

Samples of mother liquor remaining after separating terephthalic acid from the oxidation reaction mixture obtained by oxidising p-xylene with a molecular oxygen-containing gas in an acetic acid solvent in presence of a catalyst comprising cobalt, manganese and bromide ions, were adjusted in bromide content by adding hydrobromic acid and then had the composition indicated in the following Tables 2 and 3. The solutions were passed through the resin at a rate of 2 bed volumes per hour and the proportions of cobalt, bromide and, where appropriate, other ions in the solution leaving the column were measured.

Effect of Ratio of Bromide to Cobalt in the feed to the Resin on the % of Bromide and Cobalt Lost by Non-Absorption The results are given in Table 2.

Separation of Corrosion Metals and Sodium

The results are given in Table 3. The percentage separation of other metals from cobalt has been calculated. The results are also illustrated graphically in the drawing.

TABLE 2

| Example No. | Br by wt. in feed Co | Br Loss % wt. | Co Loss % wt. |
|---|---|---|---|
| 4 | 2.05 | 2.5 | 26.0 |
| 5 | 2.50 | 0.5 | 21.0 |
| 6 | 2.74 | 2.3 | 7.7 |
| 7 | 3.29 | 3.5 | 5.7 |
| 8 | 3.56 | 11.6 | 0.4 |
| 9 | 4.54 | 27.3 | 1.1 |
| 10 | 4.84 | 29.1 | 0.6 |
| 11 | 5.01 | 34.2 | 0.1 |

TABLE 2-continued

| Example No. | Br by wt. in feed Co | Br Loss % wt. | Co Loss % wt. |
|---|---|---|---|
| 12 | 5.24 | 44.0 | 0.2 |

TABLE 3

| | Composition of Feed solution: ppm in 95% aqueous acetic acid | | | | | | |
|---|---|---|---|---|---|---|---|
| Example No. | Co | Br | Fe | Cr | Ni | Mn | Na |
| 5 | 1842 | 4609 | 15.5 | 3.2 | 9.5 | 88.5 | 245 |
| 6 | 1855 | 5085 | 15.0 | 2.6 | 8.3 | 83 | 212 |
| 7 | 1762 | 5790 | 15.3 | 1.4 | 9.4 | 84 | 240 |
| 8 | 1911 | 6809 | 16.5 | 3.3 | 7.9 | 84 | 226 |
| 9 | 1768 | 8027 | 19.0 | 2.8 | 9.0 | 89 | 300 |
| 10 | 1866 | 9036 | 19.1 | 2.8 | 8.7 | 84.5 | 235 |

| | Br by wt Co in feed | Co Returned on Resin wt % | % Separation from Co | | | | |
|---|---|---|---|---|---|---|---|
| | | | Fe | Cr | Ni | Mn | Na |
| 5 | 2.50 | 79.0 | 92 | 100 | 79 | 78 | 98 |
| 6 | 2.74 | 92.3 | 61 | 97 | 84 | 68 | 99 |
| 7 | 3.29 | 94.3 | 27 | 100 | 94 | 50 | 98 |
| 8 | 3.56 | 99.6 | Nil | 85 | 44 | 33 | 97 |
| 9 | 4.54 | 98.9 | Nil | Nil | 38 | 17 | 91 |
| 10 | 4.84 | 99.4 | Nil | 21 | 39 | 19 | 98 |

EXAMPLE 13

Separation of Organic Impurities

A sample of mother liquor remaining after separating terephthalic acid from the oxidation reaction mixture obtained by oxidising p-xylene with a molecular oxygen-containing gas in an acetic acid solvent in presence of a cobalt/manganese/bromide catalyst was analysed, by gas-liquid chromatography, for organic impurities commonly found therein. The liquor was passed through a resin column as described in Example 4 to 12. The liquid leaving the column was similarly analysed for the same impurities. The cobalt absorbed on the column was then desorbed as previously described and the eluate analysed for the same impurities. The percentage of organic impurities removed from cobalt by nonabsorption on the resin bed was then calculated. The results are given in Table 4.

TABLE 4

| Organic Component | Wt Fed % to Bed (g) | Wt on Bed (g) | Wt % Organics Removed |
|---|---|---|---|
| Benzoic acid | 0.432 | 0.0016 | 99.6 |
| p-Toluic acid | 0.588 | 0.0018 | 99.7 |
| o-Phthalic acid | 0.241 | 0.0033 | 98.6 |
| Terephthalic acid | 0.290 | 0.0080 | 97.2 |
| Isophthalic acid | 0.621 | 0.0086 | 98.6 |
| 4-Carboxyybenzyl alcohol acetate | 0.843 | nil | 100 |
| Hemimellitic acid | 0.219 | 0.0046 | 97.9 |
| 1,2-(p-Carboxyphenyl)ethane | 0.049 | nil | 100 |

I claim:

1. A process for recovering cobalt catalyst values from the reaction mother liquor resulting from the oxidation in the liquid phase to a mono or polycarboxylic acid of a feedstock oxidisable thereto by means of a molecular oxygen-containing gas in presence of a lower aliphatic monocarboxylic acid and of a catalyst comprising cobalt and bromide ions followed by separation of the said mono or polycarboxylic acid from the said reaction mother liquor, which process comprises,
   (1) providing in the said reaction a mother liquor having a cobalt concentration from 0.1% to 10% by weight of cobalt in said lower aliphatic monocarboxylic acid, and, having the bromide concentration so that the ratio of bromide to cobalt is from 1.5:1 to 4.5:1 by weight,
   (2) contacting the resulting solution containing cobalt and bromide ions with a strongly basic anion exchange resin whereby cobalt and bromide values are adsorbed on said resin, and
   (3) eluting cobalt and bromide values from said anion exchange resin with lower aliphatic monocarboxylic acid containing more than 10% by weight of water.

2. The process of claim 1 in which the mother liquor is concentrated by distillation prior to contacting with the resin.

3. The process of claim 1 in which the solution to be fed to the resin contains less than 10% by weight of water.

4. The process of claim 1 in which, in step 1, the ratio of bromide to cobalt is adjusted by adding more bromide ion.

5. The process of claim 1 in which cobalt and bromide values eluted from the resin in step 3 are recycled to provide catalyst values for the oxidation.

6. The process of claim 1 in which the lower aliphatic monocarboxylic acid used for elution in step 3 contains more than 25% by weight of water.

7. The process of claim 1 in which the ratio of bromide to cobalt in the solution fed to the resin is from 2.7:1 to 3.3:1.

8. The process of claim 1 in which cobalt and bromide values are separated from ions of corrosion metals and/or alkali metal ions and/or organic impurities formed in the oxidation which comprises adsorbing cobalt and bromide ions on the said resin in step 2 while at least a part of the remaining ions pass through the said resin unabsorbed.

9. The process of claim 1 in which from 10% to 50% by weight of the mother liquor resulting from the oxidation are treated.

10. The process of claim 1 in which cobalt catalyst values are recovered from the oxidation of p-xylene to terephthalic acid in the presence of a cobalt, manganese and bromide catalyst and an acetic acid solvent, for recycle to the oxidation process.

* * * * *